US005109885A

United States Patent [19]

Tauscher

[11] Patent Number: 5,109,885

[45] Date of Patent: May 5, 1992

[54] SOLENOID VALVE, IN PARTICULAR FOR FUEL-INJECTION PUMPS

[75] Inventor: Joachim Tauscher, Stuttgart, Fed. Rep. of Germany

[73] Assignee: Robert Bosch GmbH, Stuttgart, Fed. Rep. of Germany

[21] Appl. No.: 700,150

[22] PCT Filed: Nov. 3, 1989

[86] PCT No.: PCT/DE89/00697

§ 371 Date: May 14, 1991

§ 102(e) Date: May 14, 1991

[87] PCT Pub. No.: WO90/05845

PCT Pub. Date: May 31, 1990

[30] Foreign Application Priority Data

Nov. 15, 1988 [DE] Fed. Rep. of Germany ....... 3838599

[51] Int. Cl.[5] ........................ F16K 31/06; F02M 51/00

[52] U.S. Cl. ............................... 137/554; 251/129.02; 251/129.16; 251/129.04

[58] Field of Search ...................... 251/129.02, 129.16, 251/129.04; 137/554

[56] References Cited

U.S. PATENT DOCUMENTS 4,628,885 12/1986 Ogburn et al. .

FOREIGN PATENT DOCUMENTS

0241697A1 10/1987 European Pat. Off. .
2158612A 11/1985 United Kingdom .

*Primary Examiner*—Arnold Rosenthal
*Attorney, Agent, or Firm*—Kenyon & Kenyon

[57] ABSTRACT

In a solenoid valve, in particular for fuel-injection pumps, the end position of the valve needle (20) is detected when the valve seating (14) is fully opened by a position signalling device (46), which has a piezoelectric ceramic disk (47) arranged on the stroke-limit stop (28) for the valve needle (20). To transmit the valve-opening signal produced by the piezoelectric ceramic disk (47) when the valve needle (20) strikes the control element (40) of the solenoid valve, a double-conductor connecting cable (34), which is required for the excitation of the electromagnet (25) of the solenoid valve, is used. For this purpose, the circuit element (44) in the control element (40), which causes the electromagnet to be triggered, is connected downstream in the current direction, from the magnetic coil (24) via its feedback line (49) of the connecting cable (34), and the piezoelectric ceramic disk (47) is connected in parallel via the electrical outputs (51,52) of the series connection consisting of a diode (50) and of the magnetic coil (24).

6 Claims, 2 Drawing Sheets

SOLENOID VALVE, IN PARTICULAR FOR FUEL-INJECTION PUMPS

PRIOR ART

Figure 1:
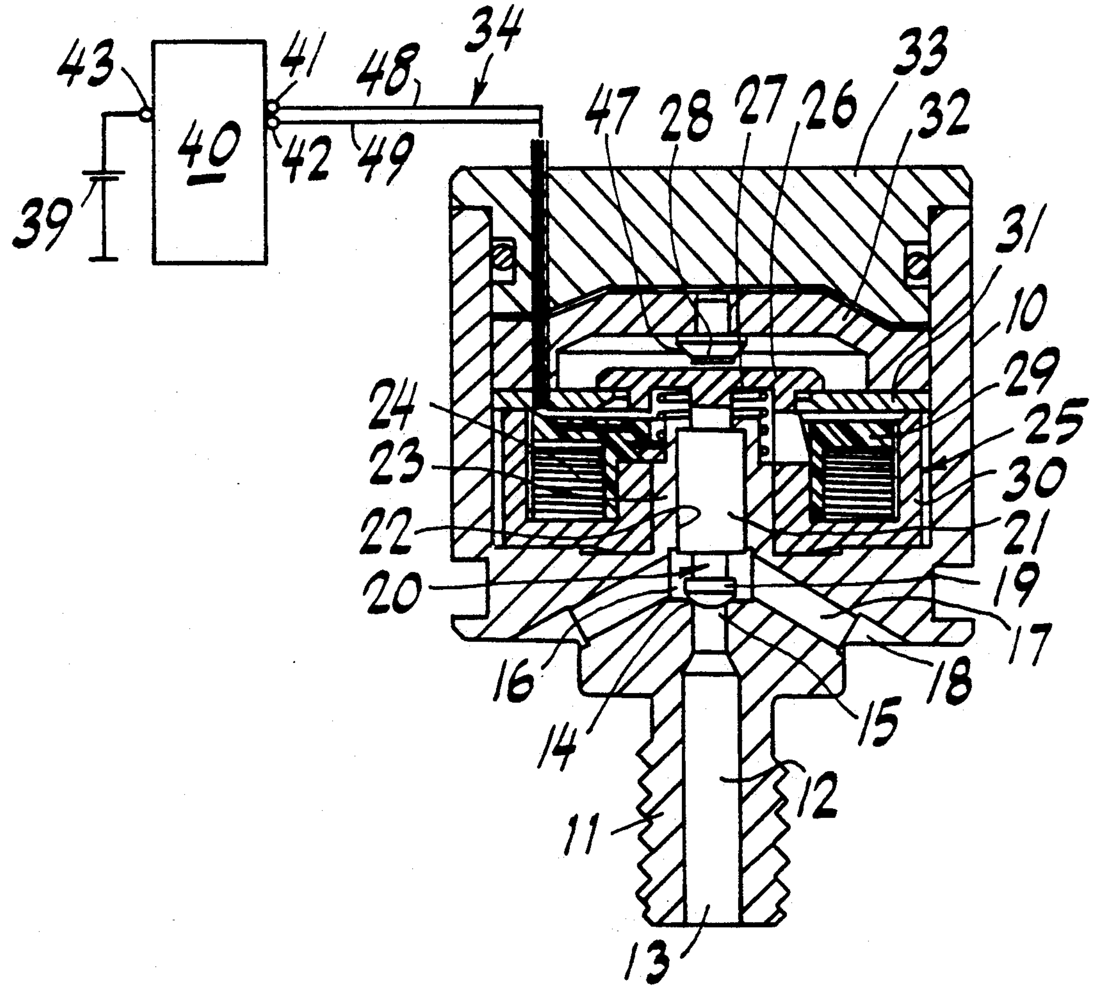

The invention relates to a solenoid valve, in particular for fuel-injection pumps.

When such solenoid valves are used in fuel-injection pumps, they are mounted in the high-pressure channel of the fuel-injection pump and used to control the fuel quantity injected per pump-piston stroke. The closing or operating time of the solenoid valve thereby determines the injection period and, with a given nozzle cross-section, also determines the fuel-injection quantity. The solenoid valves generally have constant switching times, which are constructively determined. Thus, for example, from the time that the electromagnet is no longer triggered until the valve is actually completely opened, there is a time delay in which fuel is still injected Consequently, the end of the fuel-injection phase comes later than the instant that the electromagnet is interrupted, as specified by the control element, by the amount of the constant switching time of the valve when the valve is opened.

In addition, the manufacturing tolerances of the solenoid valves, as well as long-term drift, lead to time differences between the time that the electromagnetic excitation ceases and the time that the solenoid valve actually opens. This negatively effects the capability to correctly meter fuel during the injection phase Therefore, a position signalling device has been provided for these types of solenoid valves. This position signalling device detects the two contact positions of the valve needle, namely when it contacts the valve seating (valve closed) and when it strikes against the stroke-limit stop (valve fully opened). When one has knowledge of these valve-needle contact positions, the injection fuel quantity can be very precisely dosed.

A known solenoid valve for a fuel-injection pump of the type mentioned at the outset (DE 36 33 107 Al) has a position signalling device with a disk of piezoelectric ceramic material, which is integrated in the strokelimit stop. When the solenoid valve is opened after the electromagnetic excitation has ceased, the valve needle lifts off from the valve seating under the effect of the valve-opening spring and hits the piezoelectric ceramic disk. In this manner, a voltage is generated which is fed as a valve-opening signal to the control element and is evaluated there accordingly. To this end, the two electrical outputs of the piezoelectric ceramic disk are connected to a double-conductor cable which passes as an insulated cable through the valve housing. This entails additional processing steps for the valve housing, an additional electrical connecting line to the electrical connection for the electromagnetic excitation coil, and additional expenditure for assembly.

ADVANTAGES OF THE INVENTION

In contrast, the solenoid valve according to the invention has the advantage that the electric signal, which is generated by the piezoelectric ceramic when the valve needle strikes, is transmitted to the control element without entailing any additional transmission length. As a result of the measures according to the invention, one can use the double-conductor connecting line for this, as it is available and required anyway. It can be arranged between the control element and the electromagnetic excitation winding, which serves to trigger the electromagnets. If the electromagnetic excitation is interrupted, as occurs when the circuit element, which is generally designed as a transistor final stage in the control element, is opened, then the feedback conductor of the double-conductor connecting line is uncoupled from ground.

The charges produced when the valve needle hits the piezoelectric ceramic lead to a voltage pulse in the parasitic capacitors of the diode connected in series to the excitation winding of the power transistors of the control element, and of the connecting line between the control element and the electromagnets. This voltage pulse can be tapped at the output terminal of the control element connected to the feedback conductor. This voltage pulse represents a signal for recognizing the valve-opening position If the voltage pulse is not picked off directly at the output terminal of the control element, but rather via a capacitor, then the superimposed, supply direct voltage is eliminated and the valve-opening signal is received as a significant voltage pulse that exceeds zero potential.

DRAWINGS

Figure 2:
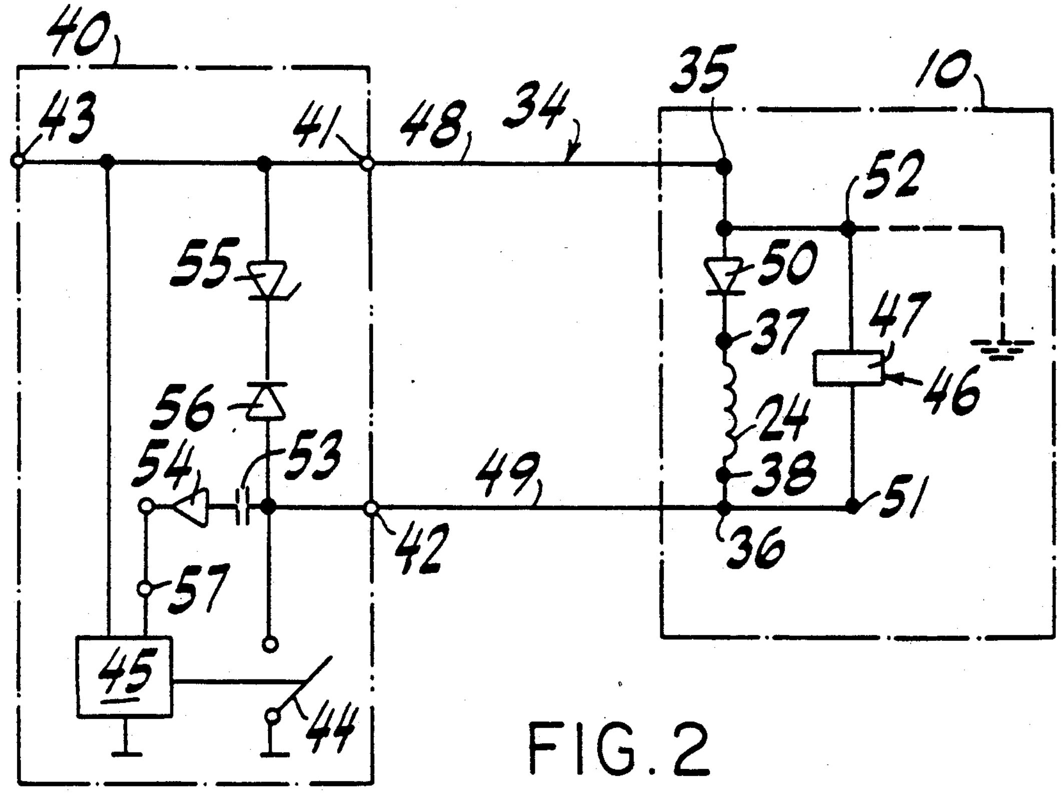
Figure 3:
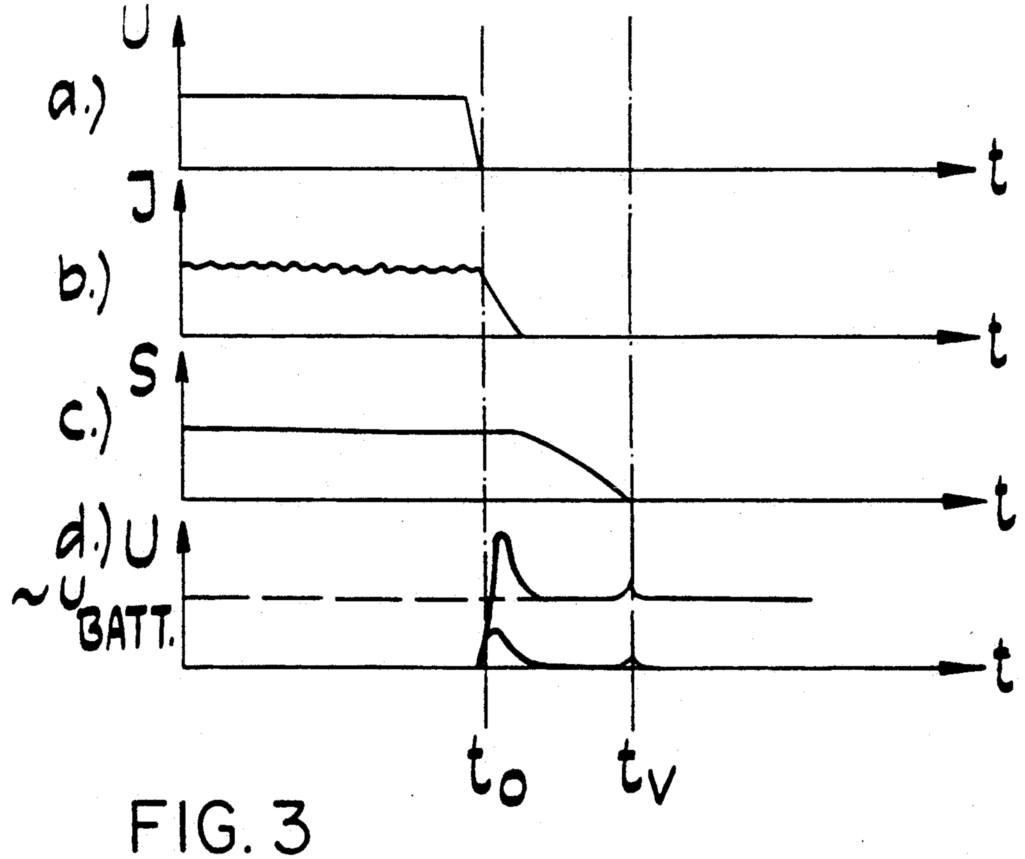

The invention is clarified in greater detail in the following description based on an exemplified embodiment depicted in the drawings The FIGS. illustrate:

FIG. 1 a longitudinal section of a solenoid valve with a control element to operate the valve;

FIG. 2 an electrical circuit diagram of a solenoid valve with a control element;

FIG. 3 various time-dependent diagrams, to be specific of the trigger pulse for the transistor final stage in the control element (a), of the current path in the excitation winding of the solenoid valve (b), of the lift of the valve needle of the solenoid valve (c), and of the voltage across the one output terminal of the control element (d above), respectively, at a tapping point for the valve-opening signal connected to this output terminal (d below).

DESCRIPTION OF THE EXEMPLIFIED EMBODIMENT

The 2/2-way solenoid valve depicted in longitudinal section in FIG. 1 has a valve housing 10 with a screwed plug 11, with which the valve housing 10 can be screwed into a bushing in the housing of a fuel-distributor injection pump, in such a way that at the same time the valve defines the pump working chamber of the injection pump. Such a fuel-distributor injection pump with an installed solenoid valve is described, for example, in DE 36 33 107 Al.

A high-pressure borehole 12 runs in the screwed plug 11 from the valve inlet 13 up to a valve opening 15 surrounded by a valve seating 14. A valve chamber 16 lying on the other side of the valve opening 15 is connected via at least one relief borehole 17 to a valve outlet 18. A cone- or mushroom-shaped section 19 of a valve needle 20 works together with the valve seating 14. The valve needle 20 is guided with a cylindrical section 21 so that it is axially displaceable in a guide borehole 22 which extends from the valve chamber 16. The guide borehole 22 is situated inside a central core 23, which is configured in one piece with the valve housing 10 and is surrounded by a magnetic coil 24 of an electromagnet 25.

At the end turned away from the cone- or mushroom-shaped section 19, the valve needle 20 is connected to an anchor plate 26 of the electromagnet 25. A compression spring 27, which works in the valve-opening direction, is fixed between the anchor plate 26 and the core 23 of the valve housing 10. When the magnetic coil 24 is not excited, the compression spring 27 positions the anchor plate 26 against a limit stop 28 to limit the lift of the valve needle 20. The magnetic coil 24 is coiled around a coil brace 29 and set in a magnet pot 30, which concentrically surrounds the core 23 of the valve housing 10. The magnet pot 30 is covered by a plate-like yoke 31. The anchor plate 26 lies opposite the yoke with a clearance which corresponds to the lift of the valve needle 20. By means of a pot-like intermediate flange 32 bearing the limit stop 28, the yoke 31 is pressed against the magnet pot 30 abutting the valve housing 10. On its part, the intermediate flange 32 is immovably retained by a housing cover 33 placed on the valve housing 10.

A double-conductor electrical connecting cable 34 passes through the housing cover 33, the intermediate flange 32 and the yoke 31 as an insulated cable and is connected with each of its terminal ends 35,36 (FIG. 2) to a winding end 37 or 38, respectively, of the magnetic coil 24. The connecting cable 34, which has one supply line 48 and one feedback line 49, is connected to a control element 40, which for its part is connected to a direct voltage, generally to the motor vehicle battery 39. The control element 40 is used to operate the solenoid valve, thus, to close and open the valve. To this end, the magnetic coil 24 is supplied with direct current, and is separated from the direct voltage The closing period for the solenoid valve is thereby essentially determined by the period of time that the magnetic coil 24 is excited.

The control element 40 features two output terminals 41,42 for connecting up the connecting cable 34, and an input terminal 43 for connecting up the positive pole of the motor vehicle battery 39. The output terminal 41 is thereby directly connected to the input terminal 43, while the output terminal 42 is connected to ground or zero potential via a transistor final stage 44, which is depicted here symbolically by a switch. The transistor final stage 44 is triggered by means of control electronics 45 in the control element 40 based upon various operating parameters of an internal combustion engine equipped with the fuel-injection pump, such as load, rotational frequency, and temperature, and to compensate for solenoid-valve switching times conditional on construction in view of the operating (switch) position of the valve, thus, the position of the valve needle 20.

Diagram a of FIG. 3 depicts a trigger pulse supplied to the transistor final stage 44 by the control electronics 45. For the duration of this pulse, the transistor final stage 44 closes, and the magnetic coil 24 of the electromagnet 25 is connected to the motor vehicle battery 39. A current, as shown in diagram b of FIG. 3, flows in the magnetic coil 24. The anchor plate 26 is pulled up to the yoke 31, and the section 19 of the valve needle sits on the valve seating 14 when the valve opening 15 is closed. The solenoid valve is closed.

At the instant $t_v$, the trigger pulse ceases and the transistor final stage 44 opens. The current in the magnetic coil 24 goes to zero with a time delay. When the excitation of the magnetic coil 24 ceases, the valve needle 20 begins to lift off from the valve seating 14, under the effect of the compression spring 27 and, at the instant $t_v$, strikes against the limit stop 28 on the intermediate flange 32. The time dependency of the valve-needle lift S is depicted in diagram c of FIG. 3. At the instant $t_v$, the lift curve S of the valve needle 20 has again reached its zero point, and the solenoid valve is completely open, so that the high-pressure borehole 12 and the relief borehole 17 are interconnected. Up to the instant $t_v$, the injection phase of the fuel-injection pump established by the instant $t_v$ is prolonged, which leads to an unwanted increase in the fuel-injection quantity Therefore, it is of considerable importance to know the instant $t_v$ in order to correct the injection quantity.

To determine the instant $t_v$, a position signalling device 46 is provided. It has a piezoelectric ceramic disk 47 arranged on the limit stop 28. As soon as the valve needle 20 hits the piezoelectric ceramic disk 47 at the instant $t_v$, electric charges are produced in the disk which lead to a voltage pulse, which can be evaluated as a measure for the valve-opening position (valve-opening signal) in the control electronics 45 to correct the instant $t_o$.

The connecting cable 34 is used to transmit the voltage pulse from the solenoid valve to the control element 40, so that a separate signal line is not needed. For this purpose, a diode 50 is connected between the terminal end 35 of the supply line 48 of the connecting cable 34 connected to the output terminal 41 and the winding end 37 of the magnetic coil 24. The diode 50 is poled so that its conducting direction points to the magnetic coil 24. Of the electrical outputs 51,52 of the piezoelectric disk 47, the output 51, which conducts the higher potential, is connected to the winding end 38 of the magnetic coil 24, and this winding end 38 is in turn connected via the feedback line 49 of the connecting cable 34 to the second output terminal 42 of the control element 40.

The output 52 of the piezoelectric ceramic disk 47 which conducts the lower potential is connected to the terminal end 35 of the supply line 48 or the anode of the diode 50. As an option, the output 52 can also be directly connected to ground or zero potential, as indicated by a broken line in FIG. 2. In the control element 40, the second output terminal 42 is connected via a capacitor 53 and an amplifier 54 to the control electronics 45. For voltage clamping, a series connection consisting of a Zener diode 55 and a blocking or inverse diode 56 is also arranged between the two output terminals 41,42, whereby the conducting direction of the Zener diode is directed toward the second output terminal 42 and the conducting direction of the blocking or inverse diode 56 toward the first output terminal 41.

If at the instant $t_v$, the valve needle 20 or the anchor plate 26 strikes the piezoelectric ceramic disk 47 on the limit stop 28, then as a result of this impact, charges are produced in the disk 47, which lead to a voltage pulse in the parasitic capacitors of the diode 50 of the transistor final stage 44 and of the connecting cable 34 with its two lines 48,49. The voltage wave shape across the second output terminal 42 is depicted in diagram d of FIG. 3 above, and the voltage wave shape across the output of the amplifier 54 or across the input 57 of the control electronics 45 in diagram d of FIG. 3 below. The voltage pulse caused by the winding inductance of the magnetic coil 24 at the instant $t_o$, when the transistor final stage 44 is opened, can be clearly seen. This voltage pulse dies away quickly and, in fact, before the valve needle 20 hits the limit stop 28. The impact of the valve needle 20 initiates the already described second voltage pulse at the instant $t_v$, which represents the valve-opening signal for the control electronics 25. After differentiating the voltage across the output terminal 42 by means of the capacitor 53 and after amplification, one obtains the voltage wave shape across the input 57 of the control electronics 45 depicted in diagram d of FIG. 3 below. The second peak is the valve-opening signal.

I claim:

1. A solenoid valve for a fuel injection pump comprising:

a housing defining a valve opening surrounded by a valve seat and coupled in fluid communication with a valve inlet and a valve outlet;

a valve needle moveable relative to the valve seat into a closed position into contact with the valve seat to close the valve opening and into an open position away from the valve seat to open the valve opening;

a stop member located adjacent to the valve needle to stop the valve needle upon reaching the open position;

an electromagnet including a winding for driving the valve needle into the closed position upon electrical excitation of the winding;

a spring member coupled to the valve needle for driving the valve needle into the open position;

a cable including a supply line coupled to one terminal of the winding and a feedback line coupled to another terminal of the winding for directing current through the winding;

a piezoelectric member coupled to the stop member for contacting the valve needle upon reaching the open position and generating a signal indicative thereof, wherein the output of the piezoelectric member conducting the higher potential is coupled between the winding and the feedback line and the other output of the piezoelectric member is coupled either between the supply line and winding or to ground or zero potential; and a control unit including a first output coupled between the supply line and a voltage source for directing current from the voltage source to the winding, and a second output coupled between the feedback line and ground or zero potential by means of a switch element, wherein the open-position signal of the piezoelectric member is transmitted by the feedback line to the second output for tapping the signal.

2. A solenoid valve as defined in claim 1, further comprising a first diode coupled between the supply line and the winding wherein the conducting direction of the first diode is toward the winding.

3. A solenoid valve as defined in claim 1, wherein the control unit further includes a capacitor coupled between the second output and the switch element for tapping the open-position signal between the capacitor and the switch element.

4. A solenoid valve as defined in claim 1, wherein the switch element is a power transistor.

5. A solenoid valve as defined in claim 3, wherein the control unit further includes an amplifier coupled between the capacitor and the switch element.

6. A solenoid valve as defined in claim 3, wherein the control unit further includes a second diode coupled in series with a third diode between the first and second outputs, and the conducting direction of the second diode is directed toward the second output and the conducting direction of the third diode is directed toward the first output.

* * * * *